United States Patent
Zhang et al.

(10) Patent No.: US 11,651,533 B2
(45) Date of Patent: May 16, 2023

(54) METHOD AND APPARATUS FOR GENERATING A FLOOR PLAN

(71) Applicant: TENCENT AMERICA LLC, Palo Alto, CA (US)

(72) Inventors: Xiang Zhang, Sunnyvale, CA (US); Bing Jian, Cupertino, CA (US); Lu He, Palo Alto, CA (US); Haichao Zhu, Los Angeles, CA (US); Shan Liu, San Jose, CA (US); Kelin Liu, Thornhill (CA); Weiwei Feng, Mountain View, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/502,520

(22) Filed: Oct. 15, 2021

(65) Prior Publication Data
US 2022/0358694 A1 Nov. 10, 2022

Related U.S. Application Data

(60) Provisional application No. 63/185,949, filed on May 7, 2021.

(51) Int. Cl.
*G06T 11/20* (2006.01)
*G06T 19/00* (2011.01)
*G06T 7/60* (2017.01)

(52) U.S. Cl.
CPC .............. *G06T 11/203* (2013.01); *G06T 7/60* (2013.01); *G06T 19/00* (2013.01); *G06T 2207/10028* (2013.01); *G06T 2219/008* (2013.01)

(58) Field of Classification Search
CPC ......... G06T 11/203; G06T 7/60; G06T 19/00; G06T 2207/10028; G06T 2219/008
See application file for complete search history.

(56) References Cited

U.S. PATENT DOCUMENTS

| 8,705,893 B1* | 4/2014 | Zhang ................. G06T 7/33 |
| | | 382/285 |
| 2002/0069013 A1* | 6/2002 | Navab ................. G01C 21/20 |
| | | 348/113 |

(Continued)

FOREIGN PATENT DOCUMENTS

| IN | 201841002147 | * | 1/2018 | ............ G06T 17/05 |

OTHER PUBLICATIONS

Pintore, et al. ; Automatic 3D Reconstruction of Structured Indoor Environments ; SIGGRAPH 202 Courses ; Jul. 2020 ; 12 Pages.

(Continued)

*Primary Examiner* — Said Broome
(74) *Attorney, Agent, or Firm* — Arentfox Schiff LLP

(57) ABSTRACT

Aspects of the disclosure include methods, apparatuses, and non-transitory computer-readable storage mediums for generating a floor plan from a point cloud model. An apparatus includes processing circuitry that receives an input three-dimensional point cloud corresponding to a three-dimensional space. The processing circuitry determines a plurality of wall planes in the received input three-dimensional point cloud. The processing circuitry generates a plurality of line segments. Each line segment is generated by projecting a respective wall plane of the plurality of wall planes to a floor plane in the three-dimensional space. The processing circuitry represents the plurality of wall planes in the three-dimensional space using the plurality of line segments in a two-dimensional space corresponding to the floor plan. The processing circuitry adjusts the plurality of line segments in the two-dimensional space to improve the floor plan. The processing circuitry generates the floor plan based on the plurality of adjusted line segments.

16 Claims, 8 Drawing Sheets

(56) References Cited

U.S. PATENT DOCUMENTS

| | | |
|---|---|---|
| 2015/0154467 A1 | 6/2015 | Feng et al. |
| 2015/0227644 A1* | 8/2015 | Schultz ............... G01C 15/002 703/1 |
| 2017/0316115 A1 | 11/2017 | Lewis et al. |
| 2018/0039713 A1 | 2/2018 | Mrowca et al. |
| 2021/0049812 A1* | 2/2021 | Ganihar ................ G06T 15/00 |

OTHER PUBLICATIONS

Cabral, et al. ; Piecewise Planar and Compact Floorplan Reconstruction from Images ; Carnegie Mellon University ; Washington University in St. Louis ; 8 Pages.

Chen, et al. ; Floor-SP: Inverse CAD for Floorplans by Sequential Room-wise Shortest Path ; Aug. 19, 2019 ; 10 Pages.

Lin, et al. ; Floorplan-Jigsaw: Jointly Estimating Scene Layout and Aligning Partial Scans ; Oct. 2019 ; 11 Pages.

International Search Report and Written Opinion dated Jan. 27, 2022 in International Patent Application No. PCT/US21/55446, 15 pages.

Gankhuyag, et al. "Automatic 20 Floorplan CAD Generation from 30 Point Clouds." In: Appl. Sci. 2020, Apr. 19, 2020, [online] [retrieved on Nov. 14, 2020 (Nov. 14, 2020)] Retrieved from the Internet < URL: https://doi.org/10.3390/app10082817 >.

\* cited by examiner

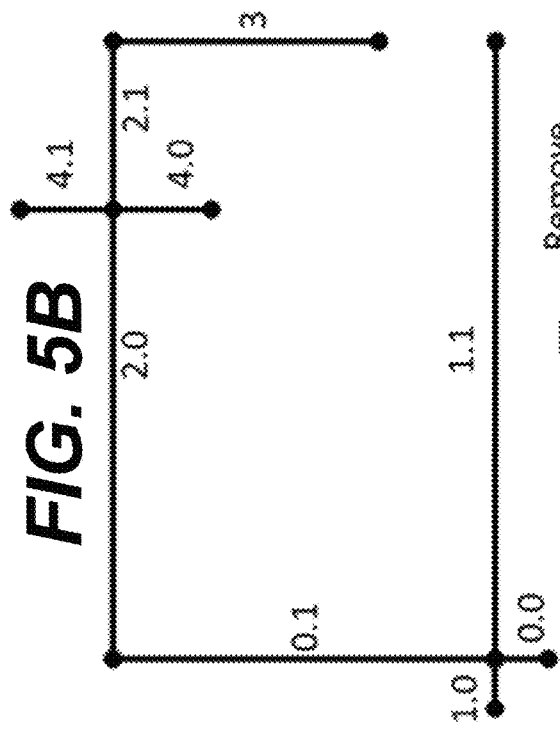
FIG. 5A
FIG. 5B
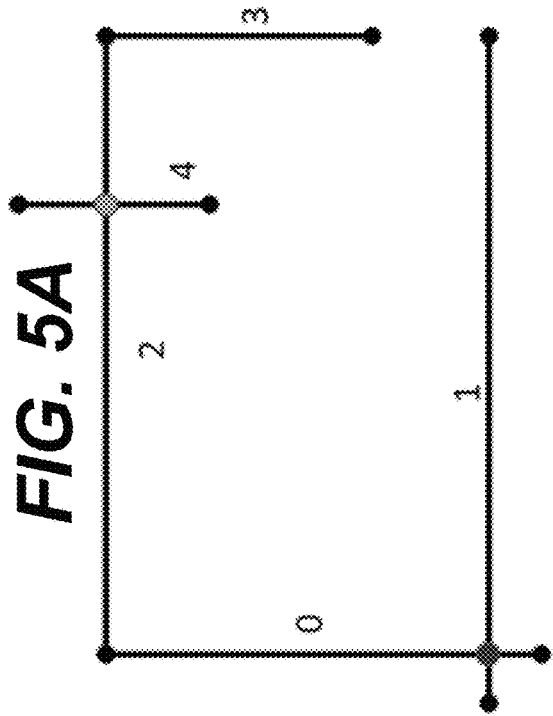
FIG. 5D
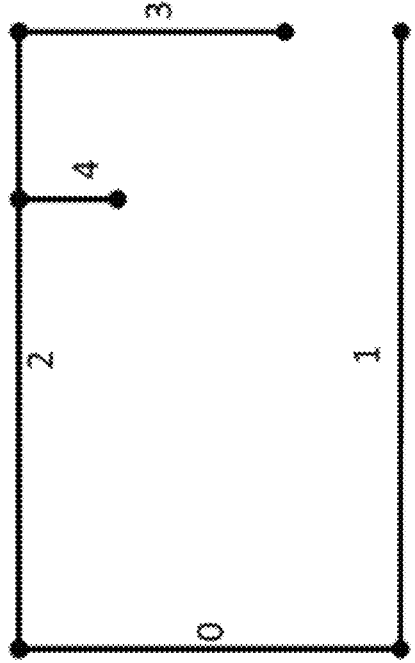
FIG. 5C

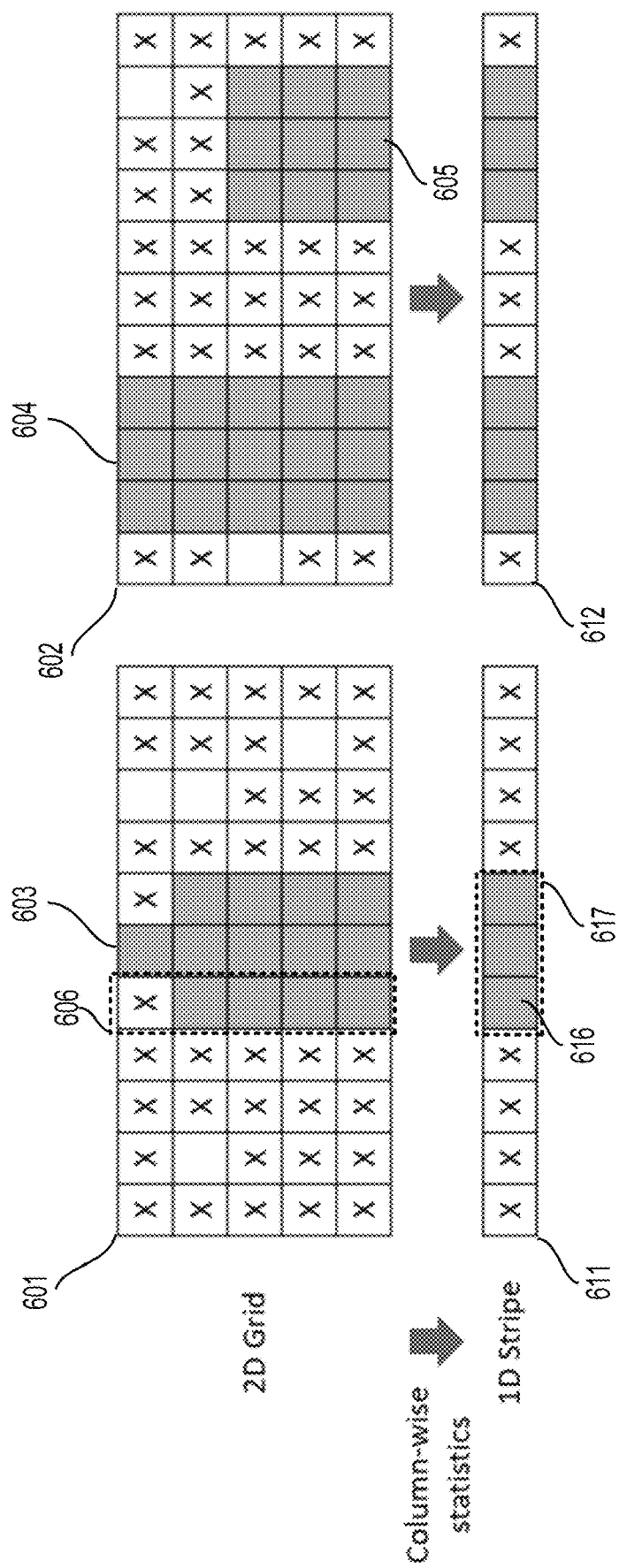

METHOD AND APPARATUS FOR GENERATING A FLOOR PLAN

INCORPORATION BY REFERENCE

This present application claims the benefit of priority to U.S. Provisional Application No. 63/185,949, "METHODS OF ESTIMATING FLOORPLAN FROM POINT CLOUDS," filed on May 7, 2021, which is incorporated by reference herein in its entirety.

TECHNICAL FIELD

The present disclosure describes embodiments generally related to generation of a floor plan of a three-dimensional space.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A three-dimensional (3D) reconstruction of an indoor building is an active research topic and has been used in various industries including real estate, building construction, building restoration, entertainment, and the like. The 3D reconstruction leverages technologies such as computer vision and machine learning by taking a single image (e.g., RGB image) or a group of images from different views as an input to generate a 3D geometry representation of the building in a scene. Advances in depth sensors have enabled even more convenient and more accurate ways of measuring depth information from the scene directly. For example, some widely used depth cameras include Lidar, structured light, and the like. The 3D reconstruction can be used in various applications and can be further converted into other representations.

A 3D geometry representation of an object can be in the form of a point cloud, which contains a set of 3D points in space. Each 3D point can include 3D position information and additional attributes such as color information and reflectance information. Another popular 3D format is a textured mesh, which contains connectivity information between neighboring points, in addition to 3D point information. Based on the connectivity information, a collection of facets (e.g., triangles) of the textured mesh can be formed. Texture information of the textured mesh can be also attached to each facet.

For applications to 3D spaces such as real estate, an important side-product of the 3D geometry is a floor plan. In production, a professional floor plan can usually be created by an expert from 3D geometry information of the buildings. FIG. 1 shows an exemplary floor plan according to an embodiment of the disclosure. In FIG. 1, the floor plan is drawn by using a professional application in a specific format of digital canvas. The floor plan contains a basic room layout with estimated dimensions and some room labels.

SUMMARY

Aspects of the disclosure provide apparatuses for generating a floor plan from a point cloud model. An apparatus includes processing circuitry that receives an input three-dimensional point cloud corresponding to a three-dimensional space. The processing circuitry determines a plurality of wall planes in the received input three-dimensional point cloud. The processing circuitry generates a plurality of line segments. Each line segment is generated by projecting a respective wall plane of the plurality of wall planes to a floor plane in the three-dimensional space. The processing circuitry represents the plurality of wall planes in the three-dimensional space using the plurality of line segments in a two-dimensional space corresponding to the floor plan. The processing circuitry adjusts the plurality of line segments in the two-dimensional space to improve the floor plan. The processing circuitry generates the floor plan based on the plurality of adjusted line segments.

In an embodiment, the processing circuitry projects a subset of points in the received input three-dimensional point cloud onto one of the plurality of wall planes. The processing circuitry determines that one of the plurality of line segments corresponds to the one of the plurality of wall planes based on the projected points.

In an embodiment, the processing circuitry calculates coordinates of two end points of the one of the plurality of line segments corresponding to the one of the plurality of wall planes based on the projected points.

In an embodiment, the one of the plurality of wall planes is represented by a plurality of grids, and the processing circuitry determines whether consecutive grids in the plurality of grids include at least one projected point. The processing circuitry determines an opening area on the one of the plurality of wall planes based on the consecutive grids not including at least one projected point. The opening area corresponds to the consecutive grids. The processing circuitry determines an opening area in the one of the plurality of line segments based on the opening area on the one of the plurality of wall planes.

In an embodiment, the one of the plurality of wall planes is represented by a plurality of columns of grids, and the processing circuitry determines whether a number of consecutive grids without a projected point in each of the plurality of columns of the grids is greater than a grid threshold. The processing circuitry determines a part of the one of the plurality of line segments corresponding to a respective one of the plurality of columns of grids as an opening area candidate part in the one of the plurality of line segments based on the number of the consecutive grids in the respective one of the plurality of columns of grids being greater than the grid threshold. The processing circuitry determines an opening area in the one of the plurality of line segments based on a number of consecutive opening area candidate parts in the one of the plurality of line segments being greater than a part threshold. The opening area corresponds to the consecutive opening area candidate parts in the one of the plurality of line segments.

In an embodiment, the processing circuitry splits one of the plurality of line segments into multiple portions based on the one of the plurality of line segments intersecting with one or more other line segments in the plurality of line segments. The processing circuitry determines which consecutive portions in the multiple portions of the one of the plurality of line segments correspond to one of the plurality of wall planes. The processing circuitry determines one of the plurality of adjusted line segments based on one or more of the consecutive portions determined to correspond to the one of the plurality of wall planes.

In an embodiment, the processing circuitry determines that one of the multiple portions corresponds to the one of the plurality of wall planes based on a length of the one of the multiple portions being greater than a length threshold.

In an embodiment, the plurality of line segments form an initial floor plan that includes a testing point, each of the multiple portions includes a plurality of sampling points, and the processing circuitry generates a plurality of test line segments for one of the multiple portions. Each of the plurality of test line segments is generated between one of sampling points of the one of the multiple portions and the testing point of the initial floor plan. The processing circuitry determines that the one of the multiple portions corresponds to the one of the plurality of wall planes based on a number of one or more test line segments in the plurality of test line segments being less than an intersection threshold. Each of the one or more test line segments intersects with at least one other line segment of the plurality of line segments.

In an embodiment, the processing circuitry removes one of the multiple portions not corresponding to the one of the plurality of wall planes. The processing circuitry merges the one or more of the consecutive portions determined to correspond to the one of the plurality of wall planes into the one of the plurality of adjusted line segments.

Aspects of the disclosure provide methods for generating a floor plan from a point cloud model. The methods can perform any one or a combination of the processes performed by the apparatuses for generating the floor plan from the point cloud model. In the method, an input three-dimensional point cloud corresponding to a three-dimensional space is received. A plurality of wall planes is determined in the received input three-dimensional point cloud. A plurality of line segments is generated. Each of the plurality of line segments is generated by projecting a respective wall plane of the plurality of wall planes to a floor plane in the three-dimensional space. The plurality of wall planes in the three-dimensional space is represented by using the plurality of line segments in a two-dimensional space corresponding to the floor plan. The plurality of line segments is adjusted in the two-dimensional space to improve the floor plan. The floor plan is generated based on the plurality of adjusted line segments.

Aspects of the disclosure also provide non-transitory computer-readable mediums storing instructions which when executed by at least one processor cause the at least one processor to perform any one or a combination of the methods for generating a floor plan from a point cloud model.

BRIEF DESCRIPTION OF THE DRAWINGS

Further features, the nature, and various advantages of the disclosed subject matter will be more apparent from the following detailed description and the accompanying drawings in which:

FIGS. 5A-5D show an exemplary procedure of refining a room layout according to an embodiment of the disclosure;

FIGS. 6A-6B show two examples of opening areas in a wall plane according to some embodiments of the disclosure;

DETAILED DESCRIPTION OF EMBODIMENTS

I. Floor Plan Generation

This disclosure is related to a three dimensional (3D) reconstruction of a 3D space (e.g., an indoor building). The 3D reconstruction can be used in various virtual reality (VR) and/or augmented reality (AR) applications such as virtual tours, a digital museum, and a virtual home sale.

To facilitate the floor plan generation, various automatic algorithms (e.g., Floor plan-jigsaw system, Floor-sp system, and the like) can be used by means of segmentation and graph optimization in some related examples. By using these automatic algorithms, a rough estimation of the room layout can be generated, which can be a good starting point for a professional floor plan. However, these automatic algorithms are quite expensive in terms of complexity, because they require a large amount of computations and optimization iterations. Further, some automatic algorithms are data-driven and heavily rely on the quality of the training data.

Figure 1:
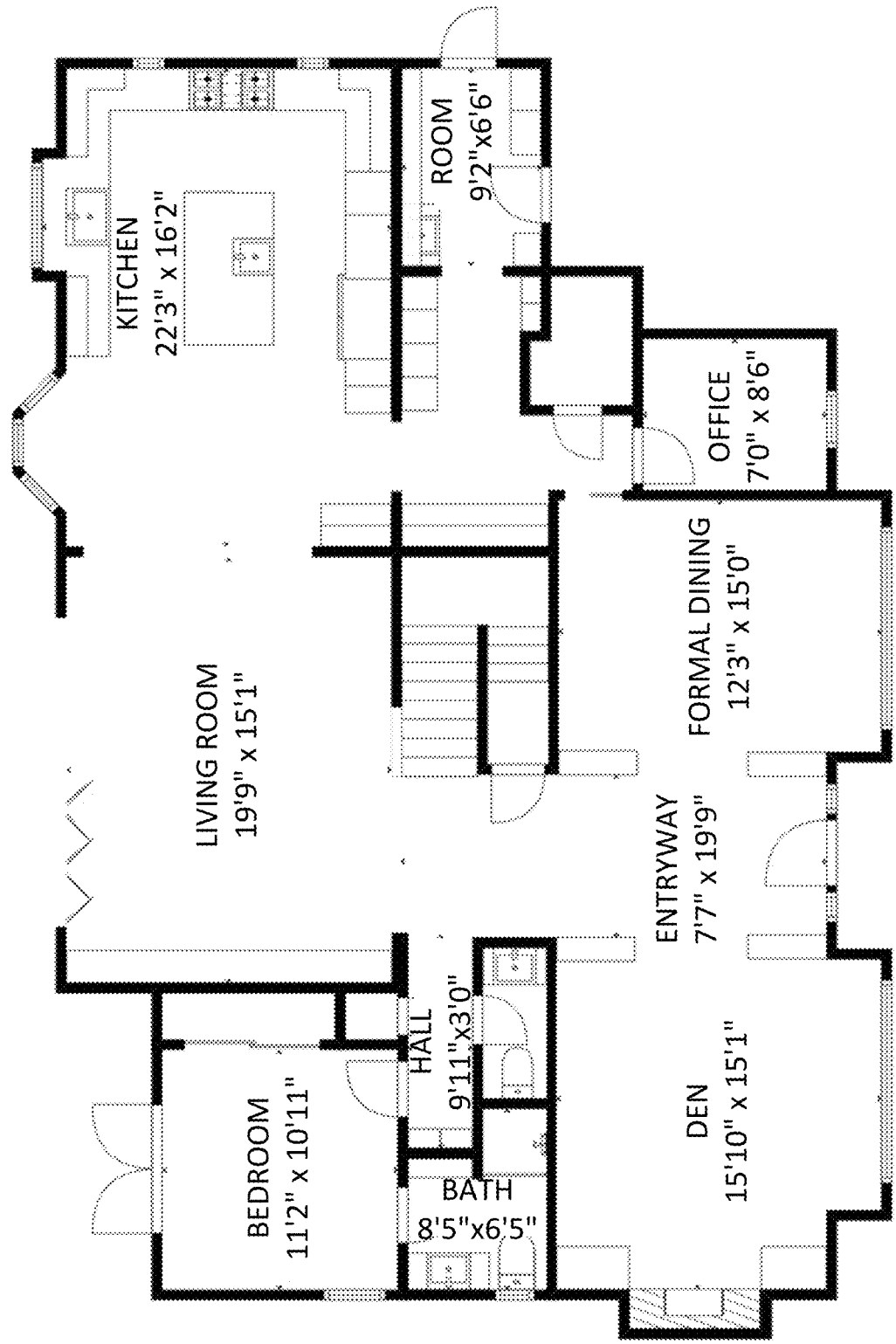
FIG. 1 shows an exemplary floor plan according to an embodiment of the disclosure.
Figure 2:
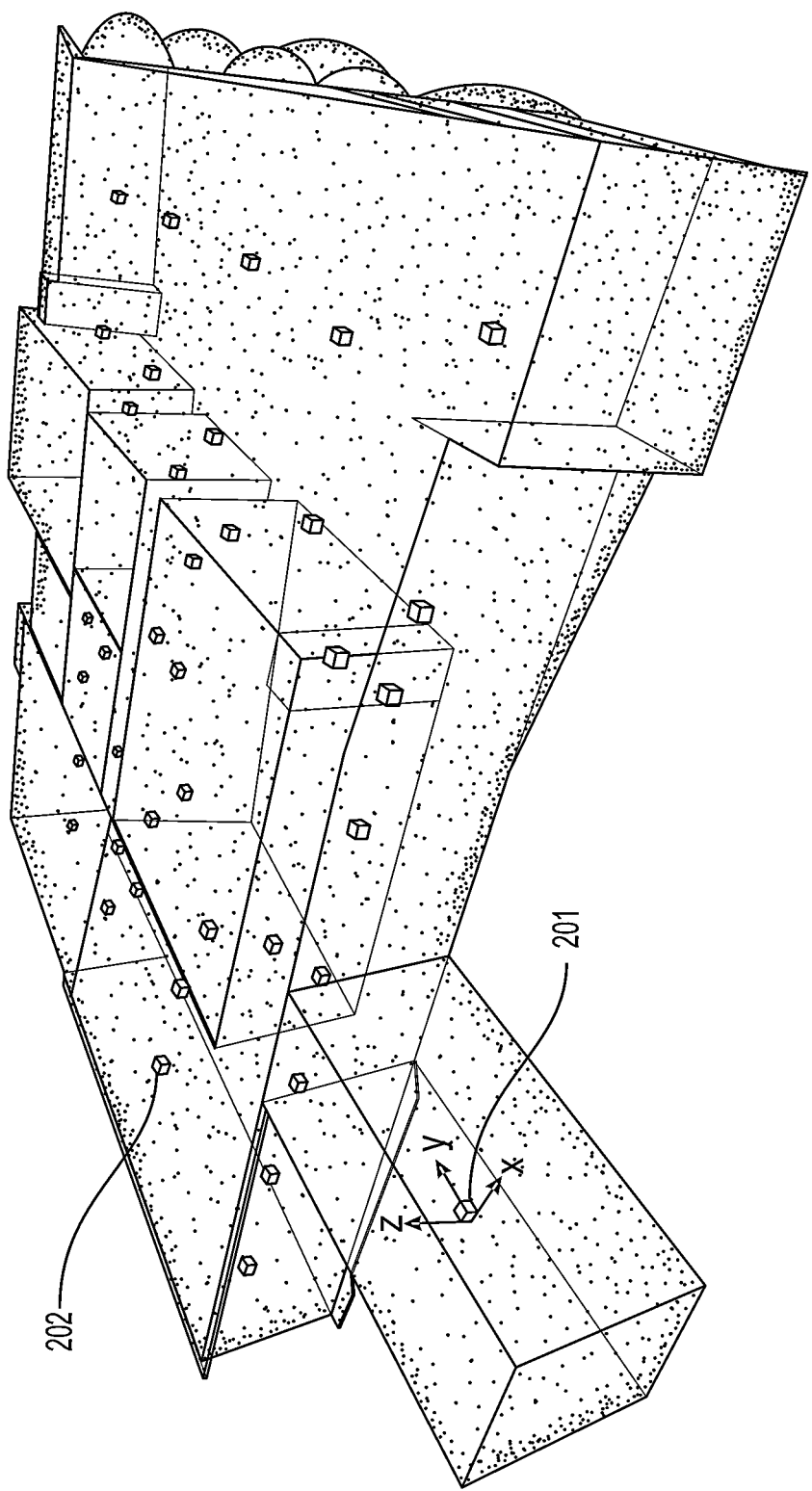
FIG. 2 shows an exemplary point cloud of a building according to an embodiment of the disclosure.

This disclosure includes methods of estimating a floor plan from a point cloud, including a simple yet effective algorithm to generate a simplified floor plan from a point cloud of a 3D space for example. FIG. 2 shows an exemplary point cloud of a building according to an embodiment of the disclosure. In the point cloud, small squares (e.g., squares (201) and (202)) indicate positions of a camera that are configured to capture images of the building for generating the point cloud. These camera positions may be optional depending on the algorithm used.

Figure 3B:
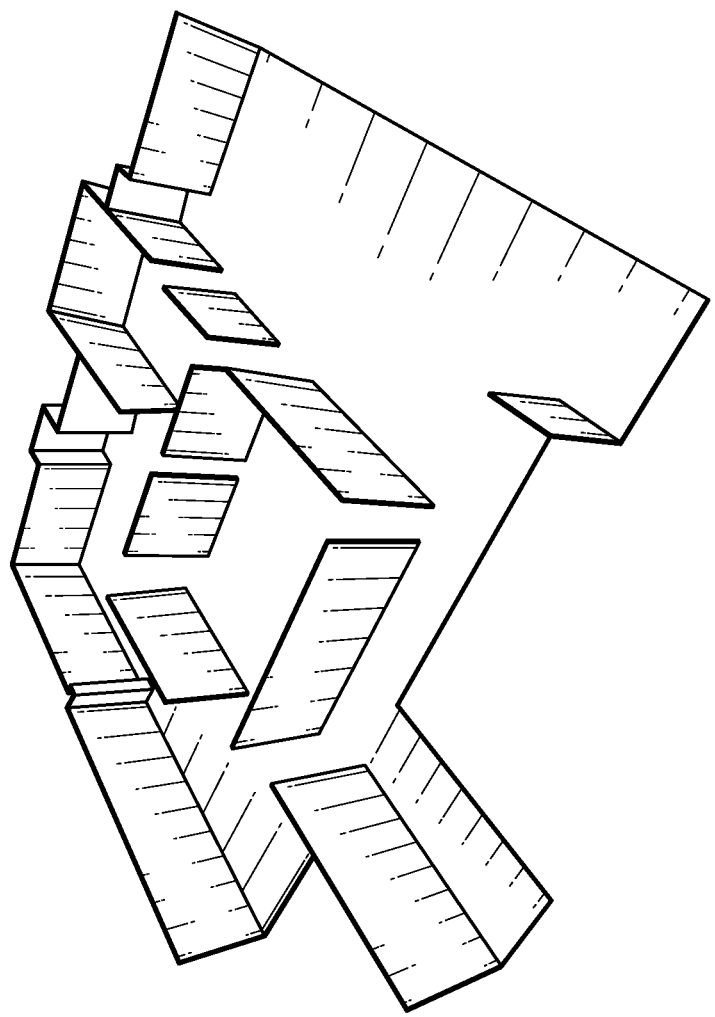
FIG. 3B shows an example of a three-dimensional model of the doll house according to an embodiment of the disclosure.
Figure 3A:
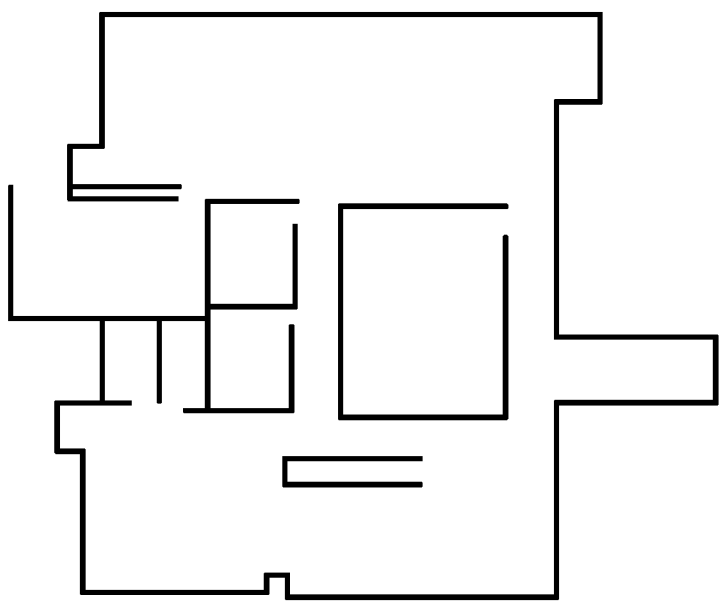
FIG. 3A shows an example of a two-dimensional floor plan of a doll house according to an embodiment of the disclosure.

FIGS. 3A-3B show an exemplary output when a point cloud of a doll house is input into an algorithm of this disclosure. The output of the algorithm includes a 2D floor plan of the doll house as shown in FIG. 3A and a 3D dollhouse representation of the dollhouse as shown in FIG. 3B.

As shown in FIG. 3A, a floor plan can include multiple wall segments and each wall segment corresponds to a wall plane in the point cloud. Therefore, in some embodiments, major wall planes in the input 3D point cloud can be detected first. These wall planes can then be represented by multiple line segments when the wall planes are projected to a floor plane in the point cloud. It is assumed that the wall planes are perpendicular to the horizontal floor plane. Then, various manipulations on the multiple line segments can be performed to improve a quality of the floor plan.

In some embodiments, it is assumed that the floor plane in the input point cloud is parallel to the x-y plane in a 3D space, the opposite z direction is towards the floor plane (or the ground plane), and the vertical walls are perpendicular to the x-y floor plane. FIG. 2 shows the directions of the x-axis, y-axis, and z-axis.

According to aspects of the disclosure, some major planes (e.g., a wall plane, a floor plane, and a ceiling plane) can be detected from a representation of the 3D space, such as the 3D point cloud. Various plane detection algorithms can be used to detect the major planes.

In one embodiment, a random sample consensus (RANSAC) algorithm can be applied to detect piecewise planes in the 3D point cloud.

In one embodiment, points in the 3D point cloud can be projected onto 2D grids in x-y plane. Line segments are then detected in the 2D plane to represent the wall planes in the 3D point cloud. For example, if a number of projected points in an area of the x-y plane is greater than a threshold, the area can be considered as a wall plane and represented by a line segment.

In one embodiment, the detected planes can be classified into different categories in terms of specific rules. For example, the detected planes can be classified into the following types based on the normal direction, size, and position of each plane: (i) a floor plane, of which the normal direction should be close to (0, 0, 1) and a z-position should be below the camera position(s); (ii) a ceiling plane, of which the normal direction should be close to (0, 0, −1) and a z-position should be above the camera positions; (iii) a wall plane, of which the normal direction should be parallel to an x-y plane; and (iv) another plane.

When the wall planes are assumed to be perpendicular to the x-y plane of the point cloud, a wall plane in the point cloud can be represented as a line segment in a 2D plane by projecting the wall plane to the x-y plane. For example, a wall plane in the point cloud lies in an infinite plane, i.e., $Ax+By+D=0$, where A, B, and D are constant coefficients, and it is assumed $A^2+B^2=1$ for convenience. The equation $Ax+By+D=0$ can be considered as a line in the 2D plane since the coefficient of the z axis is zero. A start point ($x_0$, $y_0$) and an end point ($x_1$, $y_1$) define a line segment that represents the wall plane, where ($x_0$, $y_0$) and ($x_1$, $y_1$) are on the line represented by the equation $Ax+By+D=0$.

Figure 4:
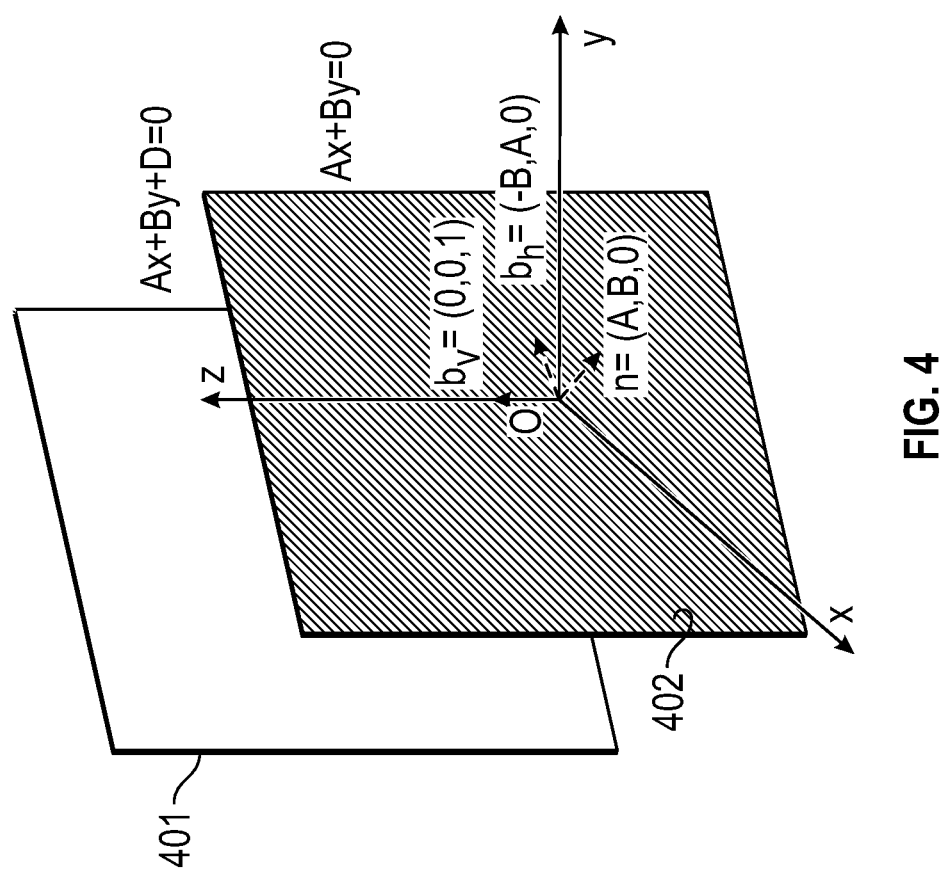
FIG. 4 shows an exemplary wall plane representation according to an embodiment of the disclosure.

FIG. 4 shows an exemplary wall plane representation according to an embodiment of the disclosure. In the representation, the solid square (401) represents the wall plane defined by $Ax+By+D=0$, and the striped square (402) is a 2D subspace plane that is parallel to the wall plane (402). The 2D subspace plane (402) can be defined by an equation $Ax+By=0$ and represented by two orthonormal basis vectors. One basis vector is perpendicular to the x-y plane (or the ground plane), i.e., $b_v=(0,0,1)^T$, and the other basis vector can be calculated by $b_h=n \times b_v=(-B, A, 0)^T$, where $n=(A, B, 0)^T$ is a normal vector of the 2D subspace plane (402). The basis vector $b_h$ is on the x-y plane by definition.

Based on the above assumption, a size of each wall can be estimated. A wall plane can be represented by a set of points detected by using a plane detection algorithm (e.g., the RANSAC algorithm). These points should be close to the wall plane (401) defined by the equation $Ax+By+D=0$. By projecting these points onto the detected wall plane (401), the size (e.g., a width and a height) of the wall plane (401) can be estimated by the two basis vectors $b_v$ and $b_h$ of the 2D subspace plane (402).

In an embodiment, for each point $p_i=(x_i,y_i,z_i)^T$ that is on or close to the wall plane (401), a coordinate of a corresponding projected point in the wall plane (401) can be calculated as $p'_i=(h_i, v_i)^T=(b_h, b_v)^T \cdot p_i$. Then, the width of the wall plane (401) can be estimated as $W=\max(h_i)-\min(h_i)$, and the height of the wall plane (401) can be estimated as $H=\max(v_i)-\min(v_i)$. The start point and the end point of the line segment representing the wall plane (401) can be calculated as $(x_0, y_0, 0)^T=\min(h_i) \cdot b_h$ and $(x_1, y_1, 0)^T=\max(h_i) \cdot b_h$.

According to aspects of the disclosure, a layout of a space (e.g., a room) can be estimated by analyzing the line segments of the detected wall planes in the point cloud. Since the wall planes can be represented by the line segments in a 2D plane, the line segments can provide a rough estimation of the room layout. A set of operations can be performed on each of the line segments to refine the room layout. The set of operations can include but is not limited to, the following steps: (1) check intersection(s) of a line segment with other line segment(s); (2) split the line segment into multiple portions if the line segment intersects with one or more other line segments; (3) remove outlier portion(s) of the multiple portions; (4) merge remaining consecutive portions into a new line segment. In some embodiments, the removal of the outlier portion(s) can include a rectification step. For example, the line segment can be rectified based on additional information such as camera positions. It is noted that any combination of these operations in any order can be used to refine the room layout. Further, not all operations are required in all embodiments.

FIGS. 5A-5D show an exemplary procedure of refining a room layout according to an embodiment of the disclosure. FIG. 5A shows a rough room layout (or an initial room layout), which includes five line segments 0-4. Each line segment is generated based on a respective wall plane of a plurality of wall planes of a point cloud. In FIG. 5A, intersections of the line segments are checked. If a line segment has one or more intersections with other line segment(s), the line segment can be split into multiple portions. For example, the line segment 0 and the line segment 1 intersect with each other in FIG. 5A, so the line segment 0 is split into two sub-segments 0.0 and 0.1, and the line segment 1 is split into two sub-segments 1.0 and 1.1, as shown in FIG. 5B. The line segment 2 and the line segment 4 intersect with each other in FIG. 5A, so the line segment 2 is split into two sub-segments 2.0 and 2.1, and the line segment 4 is split into two sub-segments 4.0 and 4.1, as show in FIG. 5B.

In FIG. 5C, the outlier sub-segment(s) can be removed. In an embodiment, if a length of a sub-segment is less than a length threshold, the sub-segment can be considered as an outlier sub-segment and removed. For example, the sub-segments 0.0 and 1.0 in FIG. 5B can be removed because each length is less than the length threshold. In an embodiment, a capturing position of a capturing device (e.g., a camera) that is configured to capture images of the building can be provided. If a sub-segment is not visible to the capturing device, it can be determined that a wall plane corresponding to the sub-segment is occluded by other wall plane(s) and the sub-segment can be considered as an outlier-segment and removed. For example, the determination can be determined based on the line of sight of the capturing device. In an embodiment, a sub-segment can include multiple sampling positions, and each of the multiple sampling positions can form a respective test line segment with the capturing position of the capturing device. If at least one of the test line segments intersects with one or more other line segments and a number of the at least one test line segment is greater than an intersection threshold, the sub-segment can be considered as an outlier-segment and removed. For example, the sub-segment 4.1 in FIG. 5B can be removed because it is not visible to the camera in FIG. 5C.

In FIG. 5D, the remaining sub-segments can be merged into a new line segment if the un-removed sub-segments are overlapped (or connected) and parallel to each other. For example, the sub-segments 2.0 and 2.1 in FIG. 5C can be merged into the line segment 2 in FIG. 5D.

According to aspects of the disclosure, by analyzing a pattern of 3D points associated with a wall plane certain features of the room can be identified. In some embodiments, an opening area in the wall plane such as doors and windows on the wall can be detected. The 3D points associated with the wall plane can be projected to the wall plane, which is represented by multiple 2D grids. The projected points can be voxelized into the 2D grids, as shown in FIGS. 6A-6B, where the grids marked by X indicate a voxel that is occupied by at least one point while the remaining grids are empty. Various algorithms can be applied on the 2D grids representation of the wall plane to detect the opening area.

In one embodiment, an opening area can be detected as a connected area of empty grids. The connectivity of empty grids can be defined in various means, such as an 8-connection and a 4-connection. In the 8-connection, an empty center grid and its eight empty neighboring grids can form a connected area of empty grids. An example of the 8-connection is the connected area (605) in FIG. 6B, in which a center grid is empty and its eight neighboring grid are empty too. In the 4-connection, an empty center grid and its four empty neighboring grids (e.g., a top neighboring grid, a left neighboring grid, a right neighboring grid, and a bottom neighboring grid) can form a connected area of empty girds.

In FIG. 6A, a shaded area (603) is a connected area of empty grids in the wall plane (601). In FIG. 6B, there are two connected areas (604) and (605) of empty grids in the wall plane (602). Each connected area of empty grids can be considered as an opening area candidate on the wall plane. If a connected area of empty grids satisfies one or more specific rules, it can be detected as an opening area. The rules can include but are not be limited to a minimal size of the opening area, a height of the opening area, a width of the opening area, and the like.

In one embodiment, the wall plane with the 2D grids can be reduced into a 1D row by using column-wise statistics as illustrated in FIGS. 6A-6B, in which the wall planes (601) and (602) are reduced into the 1D strips (611) and (612), respectively. An empty cell in each 1D strip can be determined based on a certain rule. For example, if a percentage (or a number) of empty grids in a column is greater than a first percentage threshold (or a first empty number threshold), a cell in the 1D strip corresponding to the column can be determined as an empty cell in the 1D stripe. In FIG. 6A, a percentage of empty grids in the column (606) is greater than the percentage threshold (e.g., 50%), and the corresponding cell (616) in the 1D strip (611) can be determined as an empty cell. If a percentage (or a number) of consecutive empty cells in the 1D strip is greater than a second percentage threshold (or a second empty number threshold), the consecutive empty cells can form an opening area in the 1D strip which represents a wall plane. For example, a number of the consecutive empty cells (617) is greater than the second empty number threshold (e.g., 2), and the consecutive empty cells (617) can be determined as an opening area in the 1D strip (611).

In one embodiment, a pattern recognition technique (e.g., a deep learning algorithm) can be applied to extract features and detect opening patterns automatically based on either the 2D grid or the 1D stripe representation of the wall plane.

This disclosure includes methods of estimating a floor plan from a point cloud of a 3D space, such as an indoor scene, by representing the wall planes in the 3D point cloud as multiple line segments in a 2D plane. Each of the wall planes can be estimated from the respective points in the 3D point cloud or the respective 2D projection on the floor plane. A room layout can be estimated by various operations on the line segments in the 2D plane. Camera positions can be used in refining the line segments. For example, a visibility of a wall plane from the camera positions can be estimated. An opening area (e.g., an opened door or a window) can be estimated from the wall plane. In addition, one or more machine learning and/or deep learning algorithms (e.g., support vector machine) can be applied so that other analyses, such as a room segmentation, a room labeling, and the like, can be performed based on the generated floor plan.

II. Flowchart

Figure 7:
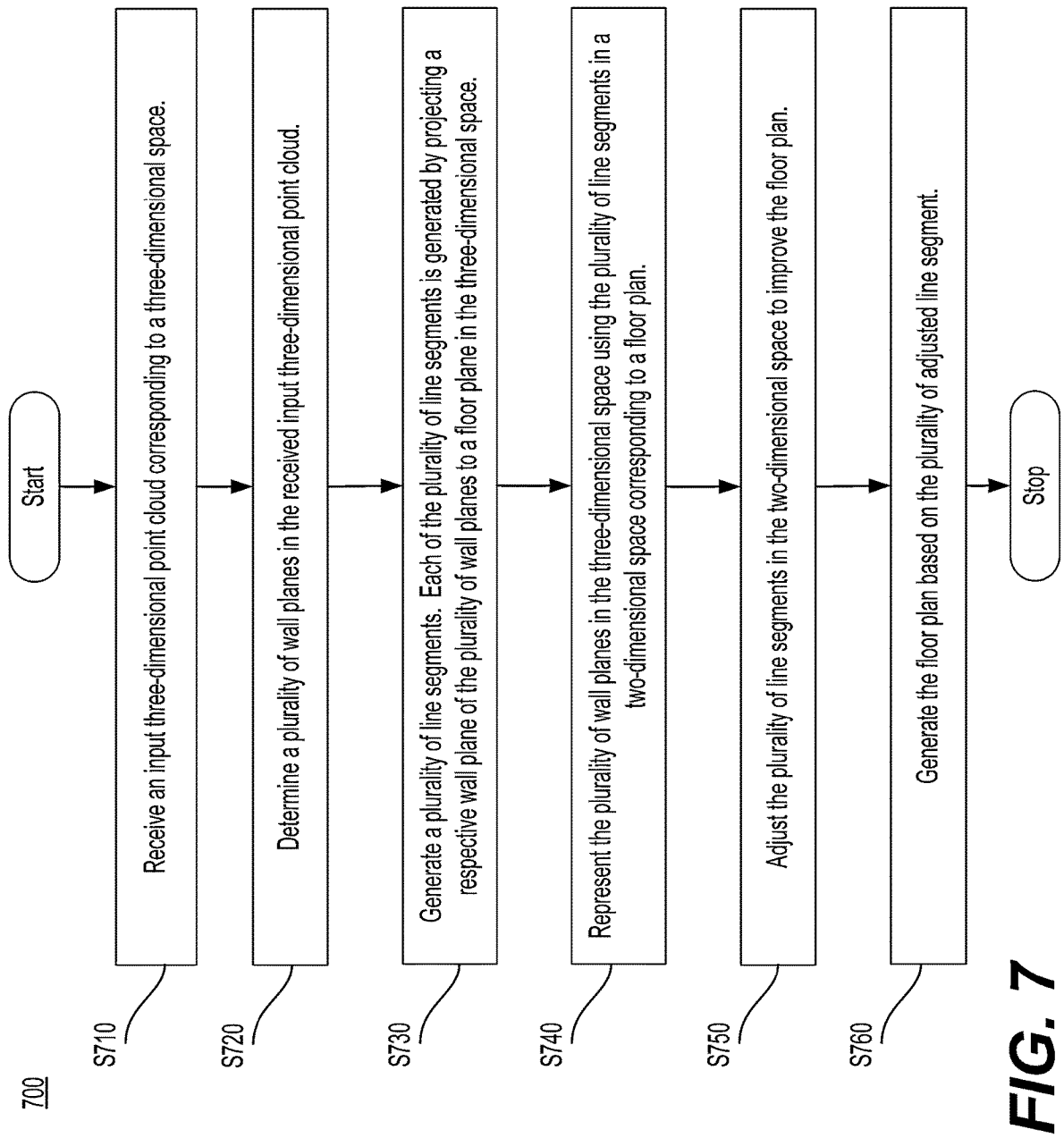
FIG. 7 shows an exemplary flowchart according to an embodiment of the disclosure.

FIG. 7 shows a flow chart outlining an exemplary process (700) according to an embodiment of the disclosure. In various embodiments, the process (700) is executed by processing circuitry, such as the processing circuitry shown in FIG. 8. In some embodiments, the process (700) is implemented in software instructions, thus when the processing circuitry executes the software instructions, the processing circuitry performs the process (700).

The process (700) may generally start at step (S710), where the process (700) receives an input three-dimensional point cloud corresponding to a three-dimensional space. Then, the process (700) proceeds to step (S720).

At step (S720), the process (700) determines a plurality of wall planes in the received input three-dimensional point cloud. Then, the process (700) proceeds to step (S730).

At step (S730), the process (700) generates a plurality of line segments. Each line segment is generated by projecting a respective wall plane of the plurality of wall planes to a floor plane in the three-dimensional space. Then, the process (700) proceeds to step (S740).

At step (S740), the process (700) represents the plurality of wall planes in the three-dimensional space using the plurality of line segments in a two-dimensional space corresponding to a floor plan. Then, the process (700) proceeds to step (S750).

At step (S750), the process (700) adjusts the plurality of line segments in the two-dimensional space to improve the floor plan. Then, the process (700) proceeds to step (S760).

At step (S760), the process (700) generates the floor plan based on the plurality of adjusted line segments. Then, the process (700) terminates.

In an embodiment, the process (700) projects a subset of points in the received input point cloud onto one of the plurality of wall planes. The process (700) determines that one of the plurality of line segments corresponds to the one of the plurality of wall planes based on the projected points.

In an embodiment, the process (700) calculates coordinates of two end points of the one of the plurality of line segments corresponding to the one of the plurality of wall planes based on the projected points.

In an embodiment, the one of the plurality of wall planes is represented by a plurality of grids, and the process (700) determines whether consecutive grids in the plurality of grids include at least one projected point. The process (700) determines an opening area on the one of the plurality of wall planes based on the consecutive grids not including at least one projected point. The opening area corresponds to the consecutive grids. The process (700) determines an opening area in the one of the plurality of line segments based on the opening area on the one of the plurality of wall planes.

In an embodiment, the one of the plurality of wall planes is represented by a plurality of columns of grids, and the process (700) determines whether a number of consecutive grids without a projected point in each of the plurality of columns of the grids is greater than a grid threshold. The process (700) determines a part of the one of the plurality of line segments corresponding to a respective one of the plurality of columns of grids as an opening area candidate part in the one of the plurality of line segments based on the number of the consecutive grids in the respective one of the plurality of columns of grids being greater than the grid threshold. The process (700) determines an opening area in the one of the plurality of line segments based on a number of consecutive opening area candidate parts in the one of the plurality of line segments being greater than a part threshold. The opening area corresponds to the consecutive opening area candidate parts in the one of the plurality of line segments.

In an embodiment, the process (700) splits one of the plurality of line segments into multiple portions based on the one of the plurality of line segments intersecting with one or more other line segments in the plurality of line segments. The process (700) determines which consecutive portions in the multiple portions of the one of the plurality of line segments correspond to one of the plurality of wall planes. The process (700) determines one of the plurality of adjusted line segments based on one or more of the consecutive portions determined to correspond to the one of the plurality of wall planes.

In an embodiment, the process (700) determines that one of the multiple portions corresponds to the one of the plurality of wall planes based on a length of the one of the multiple portions being greater than a length threshold.

In an embodiment, the plurality of line segments form an initial floor plan that includes a testing point, each of the multiple portions includes a plurality of sampling points, and the process (700) generates a plurality of test line segments for one of the multiple portions. Each of the plurality of test line segments is generated between one of sampling points of the one of the multiple portions and the testing point of the initial floor plan. The process (700) determines that the one of the multiple portions corresponds to the one of the plurality of wall planes based on a number of one or more test line segments in the plurality of test line segments being less than an intersection threshold. Each of the one or more test line segments intersects with at least one other line segment of the plurality of line segments.

In an embodiment, the process (700) removes one of the multiple portions not corresponding to the one of the plurality of wall planes. The process (700) merges the one or more of the consecutive portions determined to correspond to the one of the plurality of wall planes into the one of the plurality of adjusted line segments.

III. Computer System

The techniques described above, can be implemented as computer software using computer-readable instructions and physically stored in one or more computer-readable media. For example, FIG. 8 shows a computer system (800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
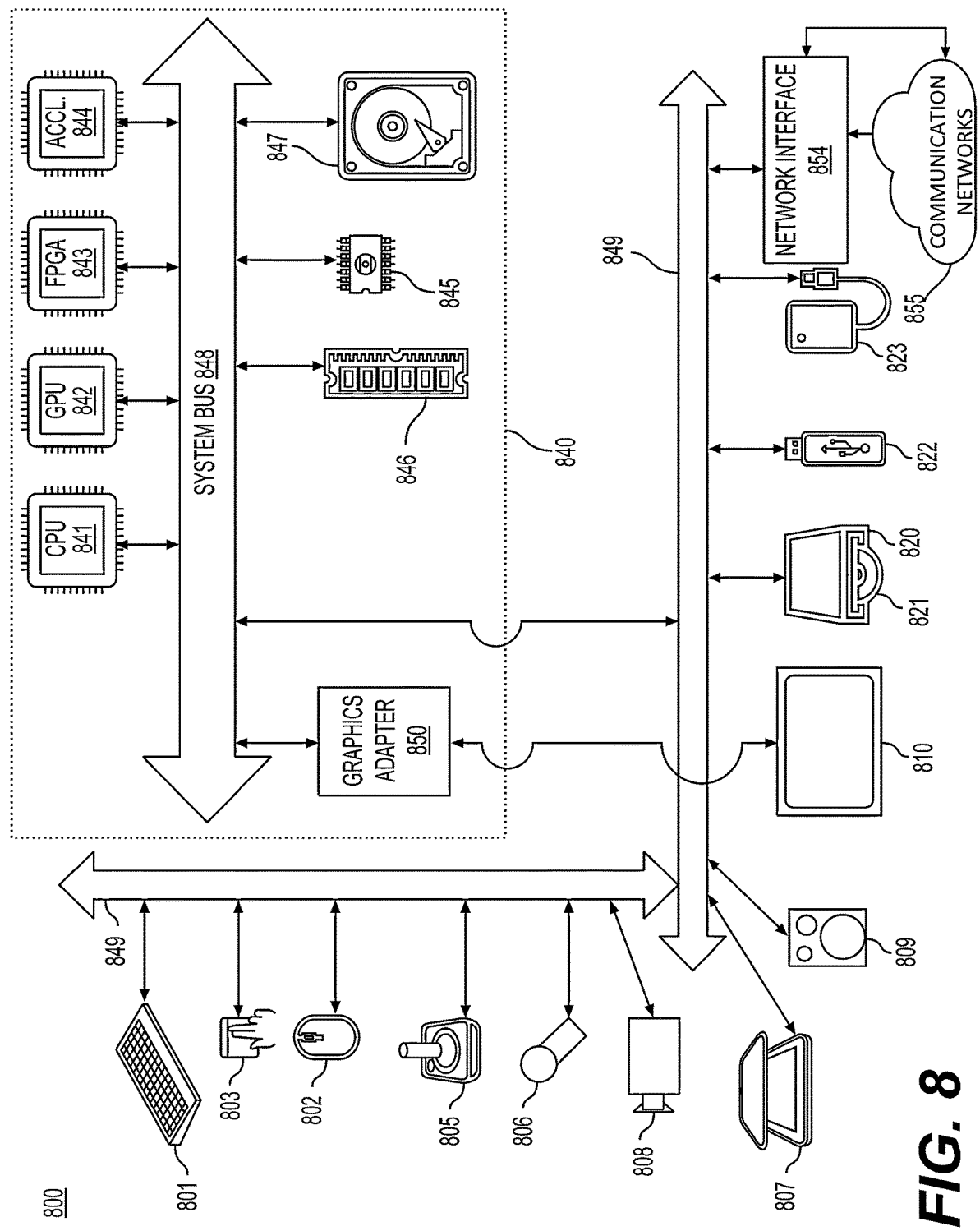
FIG. 8 is a schematic illustration of a computer system according to an embodiment of the disclosure.

The components shown in FIG. 8 for computer system (800) are exemplary in nature and not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), and camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (810)) can be connected to a system bus (848) through a graphics adapter (850).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include a network interface (854) to one or more communication networks (855). The one or more communication networks (855) can for example be wireless, wireline, optical. The one or more communication networks (855) can further be local, wide-area, metropolitan, vehicular and industrial, real-time, delay-tolerant, and so on. Examples of the one or more communication networks (855) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), graphics adapters (850), and so forth. These devices, along with Read-only memory (ROM) (845), Random-access memory (846), internal mass storage (847) such as internal non-user accessible hard drives, SSDs, and the like, may be connected through the system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). In an example, the screen (810) can be connected to the graphics adapter (850). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800) and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of generating a floor plan from a point cloud model, the method comprising:
    receiving an input three-dimensional point cloud corresponding to a three-dimensional space;
    determining a plurality of wall planes in the received input three-dimensional point cloud;
    generating, by a processor, a plurality of line segments, each of the plurality of line segments being generated by
        projecting a subset of points in the received input three-dimensional point cloud onto one of the plurality of wall planes, and
        generating one of the plurality of line segments corresponding to the one of the plurality of wall planes by projecting the one of the plurality of wall planes onto a floor plane in the three-dimensional space and calculating coordinates of two end points of the one of the plurality of line segments corresponding to the one of the plurality of wall planes based on the projected subset of points;
    representing the plurality of wall planes in the three-dimensional space using the plurality of line segments in a two-dimensional space corresponding to the floor plan;
    adjusting the plurality of line segments in the two-dimensional space based on one or more refinement operations; and
    generating the floor plan based on the plurality of adjusted line segments.

2. The method of claim 1, wherein
    the one of the plurality of wall planes is represented by a plurality of grids, and
    the adjusting comprises:
        determining whether consecutive grids in the plurality of grids include at least one projected point;
        determining an opening area in the one of the plurality of wall planes based on the consecutive grids not including at least one projected point, the opening area corresponding to the consecutive grids; and determining an opening area in the one of the plurality of line segments based on the opening area in the one of the plurality of wall planes.

3. The method of claim 1, wherein
the one of the plurality of wall planes is represented by a plurality of columns of grids, and
the adjusting comprises:
determining whether a number of consecutive grids without a projected point in each of the plurality of columns of the grids is greater than a grid threshold;
determining a part of the one of the plurality of line segments corresponding to a respective one of the plurality of columns of grids as an opening area candidate part in the one of the plurality of line segments based on a number of the consecutive grids in the respective one of the plurality of columns of grids being greater than the grid threshold; and
determining an opening area in the one of the plurality of line segments based on a number of consecutive opening area candidate parts in the one of the plurality of line segments being greater than a part threshold, the opening area corresponding to the consecutive opening area candidate parts in the one of the plurality of line segments.

4. The method of claim 1, wherein the adjusting comprises:
splitting one of the plurality of line segments into multiple portions based on the one of the plurality of line segments intersecting with one or more other line segments in the plurality of line segments;
determining which consecutive portions in the multiple portions of the one of the plurality of line segments correspond to one of the plurality of wall planes; and
determining one of the plurality of adjusted line segments based on one or more of the consecutive portions determined to correspond to the one of the plurality of wall planes.

5. The method of claim 4, wherein the determining which consecutive portions comprises:
determining that one of the multiple portions corresponds to the one of the plurality of wall planes based on a length of the one of the multiple portions being greater than a length threshold.

6. The method of claim 4, wherein
the plurality of line segments form an initial floor plan that includes a testing point, each of the multiple portions includes a plurality of sampling points, and
the determining which consecutive portions comprises:
generating a plurality of test line segments for one of the multiple portions, each of the plurality of test line segments being generated between one of sampling points of the one of the multiple portions and the testing point of the initial floor plan; and
determining that the one of the multiple portions corresponds to the one of the plurality of wall planes based on a number of one or more test line segments in the plurality of test line segments being less than an intersection threshold, each of the one or more test line segments intersecting with at least one other line segment of the plurality of line segments.

7. The method of claim 4, wherein the determining the one of the plurality of adjusted line segments comprises:
removing one of the multiple portions not corresponding to the one of the plurality of wall planes; and merging the one or more of the consecutive portions determined to correspond to the one of the plurality of wall planes into the one of the plurality of adjusted line segments.

8. An apparatus, comprising:
processing circuitry configured to:
receive an input three-dimensional point cloud corresponding to a three-dimensional space;
determine a plurality of wall planes in the received input three-dimensional point cloud;
generate a plurality of line segments, each of the plurality of line segments being generated by
projecting a subset of points in the received input three-dimensional point cloud onto one of the plurality of wall planes, and
generating one of the plurality of line segments corresponding to the one of the plurality of wall planes by projecting the one of the plurality of wall planes onto a floor plane in the three-dimensional space and calculating coordinates of two end points of the one of the plurality of line segments corresponding to the one of the plurality of wall planes based on the projected subset of points;
represent the plurality of wall planes in the three-dimensional space using the plurality of line segments in a two-dimensional space corresponding to a floor plan;
adjust the plurality of line segments in the two-dimensional space based on one or more refinement operations; and
generate the floor plan based on the plurality of adjusted line segments.

9. The apparatus of claim 8, wherein
the one of the plurality of wall planes is represented by a plurality of grids, and
the processing circuitry is configured to:
determine whether consecutive grids in the plurality of grids include at least one projected point;
determine an opening area in the one of the plurality of wall planes based on the consecutive grids not including at least one projected point, the opening area corresponding to the consecutive grids; and
determine an opening area in the one of the plurality of line segments based on the opening area in the one of the plurality of wall planes.

10. The apparatus of claim 8, wherein
the one of the plurality of wall planes is represented by a plurality of columns of grids, and
the processing circuitry is configured to:
determine whether a number of consecutive grids without a projected point in each of the plurality of columns of the grids is greater than a grid threshold;
determine a part of the one of the plurality of line segments corresponding to a respective one of the plurality of columns of grids as an opening area candidate part in the one of the plurality of line segments based on a number of the consecutive grids in the respective one of the plurality of columns of grids being greater than the grid threshold; and
determine an opening area in the one of the plurality of line segments based on a number of consecutive opening area candidate parts in the one of the plurality of line segments being greater than a part threshold, the opening area corresponding to the consecutive opening area candidate parts in the one of the plurality of line segments.

11. The apparatus of claim 8, wherein the processing circuitry is configured to:
split one of the plurality of line segments into multiple portions based on the one of the plurality of line segments intersecting with one or more other line segments in the plurality of line segments;
determine which consecutive portions in the multiple portions of the one of the plurality of line segments correspond to one of the plurality of wall planes; and
determine one of the plurality of adjusted line segments based on one or more of the consecutive portions determined to correspond to the one of the plurality of wall planes.

12. The apparatus of claim 11, wherein the processing circuitry is configured to:
determine that one of the multiple portions corresponds to the one of the plurality of wall planes based on a length of the one of the multiple portions being greater than a length threshold.

13. The apparatus of claim 11, wherein
the plurality of line segments form an initial floor plan that includes a testing point, each of the multiple portions includes a plurality of sampling points, and
the processing circuitry is configured to:
generate a plurality of test line segments for one of the multiple portions, each of the plurality of test line segments being generated between one of sampling points of the one of the multiple portions and the testing point of the initial floor plan; and
determine that the one of the multiple portions corresponds to the one of the plurality of wall planes based on a number of one or more test line segments in the plurality of test line segments being less than an intersection threshold, each of the one or more test line segments intersecting with at least one other line segment of the plurality of line segments.

14. The apparatus of claim 11, wherein the processing circuitry is configured to:
remove one of the multiple portions not corresponding to the one of the plurality of wall planes; and
merge the one or more of the consecutive portions determined to correspond to the one of the plurality of wall planes into the one of the plurality of adjusted line segments.

15. A non-transitory computer-readable storage medium storing instructions which, when executed by at least one processor, cause the at least one processor to perform:
receiving an input three-dimensional point cloud corresponding to a three-dimensional space;
determining a plurality of wall planes in the received input three-dimensional point cloud;
generating a plurality of line segments, each of the plurality of line segments being generated by
projecting a subset of points in the received input three-dimensional point cloud onto one of the plurality of wall planes, and
generating one of the plurality of line segments corresponding to the one of the plurality of wall planes by projecting the one of the plurality of wall planes onto a floor plane in the three-dimensional space and calculating coordinates of two end points of the one of the plurality of line segments corresponding to the one of the plurality of wall planes based on the projected subset of points;
representing the plurality of wall planes in the three-dimensional space using the plurality of line segments in a two-dimensional space corresponding to a floor plan;
adjusting the plurality of line segments in the two-dimensional space based on one or more refinement operations; and
generating the floor plan based on the plurality of adjusted line segments.

16. The non-transitory computer-readable storage medium of claim 15, wherein the stored instructions cause the at least one processor to perform:
splitting one of the plurality of line segments into multiple portions based on the one of the plurality of line segments intersecting with one or more other line segments in the plurality of line segments;
determining which consecutive portions in the multiple portions of the one of the plurality of line segments correspond to one of the plurality of wall planes; and
determining one of the plurality of adjusted line segments based on one or more of the consecutive portions determined to correspond to the one of the plurality of wall planes.

* * * * *